United States Patent
Seven et al.

(10) Patent No.: US 11,807,742 B2
(45) Date of Patent: Nov. 7, 2023

(54) FLAME RETARDANT POLYMERIC COMPOSITIONS

(71) Applicant: Dow Global Technologies LLC, Midland, MI (US)

(72) Inventors: Karl M. Seven, Auburn, PA (US); Alexander Williamson, Rosharon, TX (US); Stacey A. Saba, Eagleville, PA (US); Paul J. Brigandi, Schwenksville, PA (US); Jeffrey M. Cogen, Flemington, NJ (US); Mohamed Esseghir, Lawrenceville, NJ (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 18/042,611

(22) PCT Filed: Aug. 9, 2022

(86) PCT No.: PCT/US2022/074698
§ 371 (c)(1),
(2) Date: Feb. 23, 2023

(87) PCT Pub. No.: WO2023/019130
PCT Pub. Date: Feb. 16, 2023

(65) Prior Publication Data
US 2023/0272193 A1    Aug. 31, 2023

Related U.S. Application Data

(63) Continuation of application No. 63/232,055, filed on Aug. 11, 2021.

(51) Int. Cl.
*C08L 23/06* (2006.01)
*C08L 31/04* (2006.01)

(52) U.S. Cl.
CPC ............... *C08L 23/06* (2013.01); *C08L 31/04* (2013.01); *C08L 2205/035* (2013.01)

(58) Field of Classification Search
CPC ........ C08L 51/003; C08L 51/06; C08L 23/06; C08L 23/08; C08L 23/0807; C08L 23/0815
See application file for complete search history.

(56) References Cited

U.S. PATENT DOCUMENTS

| | | |
|---|---|---|
| 4,255,303 A | 3/1981 | Keogh |
| 4,525,494 A | 6/1985 | Andy |
| 5,034,442 A | 7/1991 | Hirose et al. |
| 6,569,947 B1 | 5/2003 | Feinberg |
| 7,346,257 B2 | 3/2008 | Mumm et al. |
| 7,514,489 B2 | 4/2009 | Granada, Jr. et al. |
| 9,115,273 B2 | 8/2015 | Perez et al. |
| 9,396,839 B2 | 7/2016 | Sultan et al. |
| 10,672,535 B2 | 6/2020 | Slevin et al. |
| 10,752,760 B2 | 8/2020 | Haley et al. |
| 2008/0251273 A1 | 10/2008 | Brown et al. |
| 2010/0069545 A1 | 3/2010 | Gau et al. |
| 2018/0265689 A1 | 9/2018 | Sultan et al. |
| 2019/0127568 A1 | 5/2019 | Paul |
| 2020/0224100 A1* | 7/2020 | Ni .............................. C08K 3/22 |

FOREIGN PATENT DOCUMENTS

| | | |
|---|---|---|
| EP | 2544196 | 8/2014 |
| WO | 2001051554 | 7/2001 |
| WO | 2013116283 | 8/2013 |
| WO | 2014151297 | 9/2014 |

* cited by examiner

*Primary Examiner* — Jeffrey C Mullis
(74) *Attorney, Agent, or Firm* — Mark Twilley

(57) ABSTRACT

A polymeric composition includes an ethylene-based polymer, one or more of an ionomer and an acid copolymer, a flame-retardant filler, and a maleic anhydride functionalized polyolefin. The polymeric composition has an MAH Product of 3 or greater.

9 Claims, No Drawings

FLAME RETARDANT POLYMERIC COMPOSITIONS

BACKGROUND

Field of the Disclosure

The present disclosure relates to polymeric compositions, and more specifically to flame retardant polymeric compositions.

INTRODUCTION

Cables typically employ a polymeric composition around one or more conductors (i.e., optical and/or electrical). In such cables, flame retardancy may not be a key property considered for certain elements of the cables and as such the incorporation of flame-retardant materials in elements has been limited. Recently though, flame retardancy standards have been refocusing target properties on cables as a whole, rather than the individual components. Such a change has placed a new importance on flame retardancy of those components of the cable. For example, the inclusion of buffer tubes comprising traditional unfilled polyolefins or other buffer tubes without flame retardant additives may lead to failure of the cable as a whole with respect to flame retardancy even if other components like the jacketing are flame retardant. As such, the polymeric composition of these components should exhibit a cone calorimetry value of less than 141 kilowatts per meter squared ("$kW/m^2$") as measured according to ASTM E1354 in order to comply with the new standards.

Traditional methods of adding flame retardancy to a polymeric composition include selecting a flexible base polyolefin (i.e., one having a low flexural modulus) and a flame-retardant filler for incorporation into the polyolefin. Utilizing this approach in certain applications is a challenging undertaking for a variety of reasons. First, the flexural modulus of cable components may be important and the incorporation of typical low flex modulus (e.g., 100 MPa to 200 MPa) polyolefin used in flame retardant polyolefins would result in inadequately low flex modulus of the component. Second, cable components must process well at high extrusion speeds. However, halogen free flame retardant fillers ("HFFR") are typically included at 60 wt % or more which reduces processability and final mechanical properties. Third, the mere incorporation of flame-retardant fillers is not enough to impart flame retardant properties. Without the proper compatibilization the flame retardant filler may clump within the polymeric composition providing minimal flame retardant properties while also decreasing mechanical properties. Fourth, the incorporation of HFFR often leads to a decrease in tensile elongation properties of the polymeric composition, but the percent elongation may also change based on the base resin used. Typically, an elongation of greater than 20% for applications served by high density polyethylene based polymeric compositions such as buffer tubes, and greater than 175% for applications served by ethylene-vinyl acetate based polymeric compositions such as jackets would be suitable.

The combination of ionomers and maleic anhydride grafted polymers is known in the art. For example, U.S. Pat. No. 6,569,947B1 ("The '947 patent"). discloses a maleic anhydride modified ethylene polymer/ionomer/high density polyethylene blend useful in high impact resistant materials. However, such a blend was only believed to be beneficial for the improvement of impact properties and any effect on flame retardancy was unknown.

In view of the foregoing, it would be surprising to discover a polymeric composition exhibiting a cone calorimetry value of less than 141 $kW/m^2$ as measured according to ASTM E1354, an elongation of greater than 20% for high density polyethylene or greater than 175% for ethylene-vinyl acetate based compositions as measured according to ASTM D638 and not break or crack when subjected to a Mandrel Bending Test.

SUMMARY OF THE DISCLOSURE

The inventors of the present application have discovered a polymeric composition exhibiting a cone calorimetry of less than 141 $kW/m^2$ as measured according to ASTM E1354, an elongation of greater than 20% for high density polyethylene or greater than 175% for ethylene-vinyl acetate based compositions as measured according to ASTM D638 and not break when subjected to a Mandrel Bending Test.

The invention is a result of discovering that a polymeric composition comprising an ethylene-based polymer, a maleic anhydride functionalized polyolefin, one or more of an ionomer and an acid copolymer, a flame-retardant filler and a MAH Product of 3 or greater the polymeric composition can achieve the above-noted properties. Without being bound by theory, it is believed that by using both the maleic anhydride functionalized polyolefin and one or more of an ionomer and an acid copolymer, the flame-retardant filler is coupled to the ethylene-based polymer in a manner that better disperses the metal hydroxide within the ethylene-based polymer to enhance the flame retardancy properties (i.e., a cone calorimetry value of less than 141 $kW/m^2$), but maintains the elongation above 20% or 175%, and the composition is able to survive mandrel bending. Such a result is surprising because typically the addition of fillers degrades the mechanical properties of polymeric compositions, yet the polymeric composition of the present disclosure is able to retain these properties as well as exhibit flame retardancy.

The present disclosure is particularly useful in the formation of components used in optical fiber cables.

According to a first aspect of the present disclosure, a polymeric composition comprises an ethylene-based polymer, one or more of an ionomer and an acid copolymer, a flame-retardant filler, and a maleic anhydride functionalized polyolefin, wherein the polymeric composition has an MAH Product of 3 or greater.

According to a second aspect of the present disclosure, the polymeric composition comprises from 4 wt % to 16 wt % of the maleic anhydride functionalized polyolefin based on the total weight of the polymeric composition.

According to a third aspect of the present disclosure, the maleic anhydride functionalized polyolefin comprises 0.4 wt % or greater maleic anhydride based on the total weight of the maleic anhydride functionalized polyolefin.

According to a fourth aspect of the present disclosure, the maleic anhydride functionalized polyolefin has a density of 0.90 g/cc to 0.920 g/cc as measured according to ASTM D792.

According to a fifth aspect of the present disclosure, the ethylene-based polymer has a bimodal molecular weight distribution, has a Melt Flow Ratio of 70.0 or greater and has a density of 0.945 g/cc or greater as measured according to ASTM D792.

According to a sixth aspect of the present disclosure, the polymeric composition comprises from 18 wt % to 50 wt % of the ethylene-based polymer based on the total weight of the polymeric composition.

According to a seventh aspect of the present disclosure, the polymeric composition comprises from 0.1 wt % to 10 wt % of the ionomer or acid copolymer based on the total weight of the polymeric composition.

According to an eighth aspect of the present disclosure, the polymeric composition comprises from 10 wt % to 80 wt % of the flame retardant filler based on a total weight of the polymeric composition.

According to a ninth aspect of the present disclosure, the polymeric composition comprises the ionomer and the ionomer is neutralized with one or more metal ions selected from the group consisting of Na, Zn, Li, K, Mg and combinations thereof.

According to a tenth aspect of the present disclosure, a cable comprises a conductor, and a buffer tube positioned around the conductor and comprising the polymeric composition of any one of aspects 1-9.

DETAILED DESCRIPTION

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

All ranges include endpoints unless otherwise stated.

Test methods refer to the most recent test method as of the priority date of this document unless a date is indicated with the test method number as a hyphenated two-digit number. References to test methods contain both a reference to the testing society and the test method number. Test method organizations are referenced by one of the following abbreviations: ASTM refers to ASTM International (formerly known as American Society for Testing and Materials); IEC refers to International Electrotechnical Commission; EN refers to European Norm; DIN refers to Deutsches Institut für Normung; and ISO refers to International Organization for Standards.

As used herein, the term weight percent ("wt %") designates the percentage by weight a component is of a total weight of the polymeric composition unless otherwise specified.

Melt index ($I_2$) values herein refer to values determined according to ASTM method D1238 at 190 degrees Celsius (° C.) with 2.16 Kilogram (Kg) mass and are provided in units of grams eluted per ten minutes ("g/10 min").

Density values herein refer to values determined according to ASTM D792 at 23° C. and are provided in units of grams per cubic centimeter ("g/cc").

As used herein, Chemical Abstract Services registration numbers ("CAS #") refer to the unique numeric identifier as most recently assigned as of the priority date of this document to a chemical compound by the Chemical Abstracts Service.

Polymeric Composition

The present disclosure is directed to a polymeric composition. The polymeric composition comprises an ethylene-based polymer, one or more of an ionomer and an acid copolymer, a flame retardant filler and a maleic anhydride functionalized polyolefin. The polymeric composition has a MAH Product of 3 or greater. As defined herein, the term "MAH Product" is the wt % of the maleic anhydride functionalized polyolefin (based on the total weight of the polymeric composition) multiplied by a wt % of maleic anhydride functionalization of the polyolefin (based on a total weight of the maleic anhydride functionalized polyolefin). For example, if the polymeric composition comprises 10 wt % maleic anhydride functionalized polyolefin and the polyolefin has 0.5 wt % maleic anhydride functionalization, then the MAH Product would be 5. The polymeric composition may have a MAH Product of 3 or greater, or 3.5 or greater, or 4.0 or greater, or 4.5 or greater, or 5.0 or greater, or 10 or greater, or 15 or greater, or 20 or greater, or 30 or greater, or 40 or greater, while at the same time, 50 or less, or 40 or less, or 30 or less, or 20 or less, or 15 or less, or 10 or less, or 5.0 or less, or 4.5 or less, or 4.0 or less, or 3.5 or less.

The polymeric composition may exhibit a flexural modulus of 900 MPa or greater, or 1,000 MPa or greater, or 1,100 MPa or greater, or 1,200 MPa or greater, or 1,300 MPa or greater, or 1,400 MPa or greater, or 1,500 MPa or greater, or 1,600 MPa or greater, or 1,700 MPa or greater, or 1,800 MPa or greater, or 1,900 MPa or greater, or 2,000 MPa or greater, or 2,100 MPa or greater, or 2,200 MPa or greater, or 2,300 MPa or greater, or 2,400 MPa or greater, or 2,500 MPa or greater, or 2,600 MPa or greater, or 2,700 MPa or greater, or 2,800 MPa or greater, or 2,900 MPa or greater, while at the same time, 3,000 MPa or less, or 2,900 MPa or less, or 2,800 MPa or less, or 2,700 MPa or less, or 2,600 MPa or less, or 2,500 MPa or less, or 2,400 MPa or less, or 2,300 MPa or less, or 2,200 MPa or less, or 2,100 MPA or less, or 2,000 MPa or less, or 1,900 MPa or less, or 1,800 MPa or less, or 1,700 MPa or less, or 1,600 MPa or less, or 1,500 MPa or less, or 1,400 MPa or less, or 1,300 MPa or less, or 1,200 MPa or less, or 1,100 MPA or less, or 1,000 MPa or less as measured according to ASTM D790.

The polymeric composition may exhibit a cone calorimetry value of less than 141 $kW/m^2$. For example, the polymeric composition may exhibit a cone calorimetry value of 140 $kW/m^2$ or less, or 125 $kW/m^2$ or less, or 120 $kW/m^2$ or less, or 115 $kW/m^2$ or less, or 110 $kW/m^2$ or less, or 100 $kW/m^2$ or less, or 90 $kW/m^2$ or less, or 80 $kW/m^2$ or less.

The polymer composition may exhibit an elongation at break of greater than 20% as measured according to ASTM D638. For example, the polymer composition may exhibit an elongation at break of 21% or greater, or 22% or greater, or 23% or greater, or 24% or greater, or 25% or greater, or 26% or greater, or 27% or greater, or 28% or greater, or 29% or greater, or 30% or greater, or 40% or greater, or 50% or greater, or 75% or greater, or 100% or greater, or 175% or greater, or 180% or greater, or 190% or greater, or 200% or greater, or 225% or greater, or 250% or greater, or 275% or greater or 300% or greater, while at the same time, 350% or less, or 300% or less, or 250% or less, or 200% or less, or 150% or less, or 100% or less, or 50% or less, or 30% or less as measured according to ASTM D638.

Ethylene-Based Polymer

As noted above, the composition may comprise the ethylene-based polymer. As used herein, "ethylene-based" polymers are polymers in which greater than 50 wt % of the monomers are ethylene though other co-monomers may also be employed. The ethylene-based polymer can include ethylene and one or more $C_3$-$C_{20}$ α-olefin comonomers such as propylene, 1-butene, 1 pentene, 4-methyl-1-pentene, 1-hexene, and 1-octene. Other units of the ethylene-based polymer may be derived from one or more polymerizable monomers including, but not limited to, polar monomers such as unsaturated esters. The unsaturated esters (i.e. polar monomers) may be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms. Examples of acrylates and methacrylates include, but are not limited to, ethyl acrylate, methyl acrylate, methyl methacrylate, t-butyl acrylate, n-butyl acrylate, n-butyl methacrylate, and 2 ethylhexyl acrylate. Examples of vinyl carboxylates include, but are not limited to, vinyl acetate, vinyl propionate, and vinyl butanoate. The ethylene-based polymer may have a polar comonomer content of 40 wt % or less, or 35 wt % or less, or 30 wt % or less, or 25 wt % or less, or 20 wt % or less, 15 wt %, or 10 wt %, or 5 wt % or less, or 3 wt % or less, or 1 wt % or less, or 0 wt % based on the total weight of the ethylene-based polymer as measured using Nuclear Magnetic Resonance (NMR) or Fourier-Transform Infrared (FTIR) Spectroscopy.

The ethylene-based polymer can have a unimodal or a multimodal molecular weight distribution and can be used alone or in combination with one or more other types of ethylene-based polymers (e.g., a blend of two or more ethylene-based polymers that differ from one another by monomer composition and content, catalytic method of preparation, molecular weight, molecular weight distributions, densities, etc.). If a blend of ethylene-based polymers is employed, the polymers can be blended by any in-reactor or post-reactor process. The term "multimodal polymer" refers to polymers that are characterized by having at least two distinct peaks in a gel permeation chromatography (GPC) chromatogram depicting the molecular weight distribution of the composition. Accordingly, the generic term multimodal polymer includes bimodal polymers, which have two primary fractions: a first fraction, which may be a low molecular weight fraction and/or component, and a second fraction, which may be a high molecular weight fraction and/or component.

The ethylene-based polymer may comprise 50 wt % or greater, 60 wt % or greater, 70 wt % or greater, 80 wt % or greater, 85 wt % or greater, 90 wt % or greater, or 91 wt % or greater, or 92 wt % or greater, or 93 wt % or greater, or 94 wt % or greater, or 95 wt % or greater, or 96 wt % or greater, or 97 wt % or greater, or 97.5 wt % or greater, or 98 wt % or greater, or 99 wt % or greater, while at the same time, 99.5 wt % or less, or 99 wt % or less, or 98 wt % or less, or 97 wt % or less, or 96 wt % or less, or 95 wt % or less, or 94 wt % or less, or 93 wt % or less, or 92 wt % or less, or 91 wt % or less, or 90 wt % or less, or 85 wt % or less, or 80 wt % or less, or 70 wt % or less, or 60 wt % or less of ethylene monomers as measured using Nuclear Magnetic Resonance (NMR) or Fourier-Transform Infrared (FTIR) Spectroscopy.

The polymeric composition may comprise from 18 wt % to 50 wt % of the ethylene-based polymer. For example, the polymeric composition comprises 18 wt % or greater, or 20 wt % or greater, or 25 wt % or greater, or 30 wt % or greater, or 35 wt % or greater, or 40 wt % or greater, or 45 wt % or greater, while at the same time, 50 wt % or less, or 45 wt % or less, or 40 wt % or less, or 35 wt % or less, or 30 wt % or less, or 25 wt % or less, or 20 wt % or less of the ethylene-based polymer based on a total weight of the polymeric composition.

The ethylene-based polymer has a melt flow ratio ("MFR") of 70.0 or greater. The term "melt flow ratio" refers to a ratio of melt indices of the polymer and is the high load metal index ($I_{21}$) of a polymer divided by the melt index ($I_2$) of the polymer as measured according to ASTM D1238-10 at 190° C. The MFR of the ethylene based polymer may be 70 or greater, or 80 or greater, or 90 or greater, or 100 or greater, or 110 or greater, or 120 or greater, while at the same time, 130 or less, or 120 or less, or 110 or less, or 100 or less, or 90 or less, or 80 or less.

The density of the ethylene-based polymer may be or 0.910 g/cc or greater, or 0.915 g/cc or greater, or 0.920 g/cc or greater, or 0.925 g/cc or greater, or 0.930 g/cc or greater, or 0.935 g/cc or greater, or 0.940 g/cc or greater, 0.945 g/cc or greater, or 0.950 g/cc or greater, or 0.955 g/cc or greater, or 0.960 g/cc or greater, while at the same time, 0.965 g/cc or less, or 0.960 g/cc or less, or 0.955 g/cc or less, or 0.950 g/cc or less, or 0.945 g/cc or less, or 0.940 g/cc or less, or 0.935 g/cc or less, or 0.930 g/cc or less, or 0.925 g/cc or less, or 0.920 g/cc or less, or 0.915 g/cc or less as measured according to ASTM D792. Generally, ethylene-based polymers having a density of 0.93 g/cc to 0.97 g/cc are referred to as a "high density polyethylene" or "HDPE".

The ethylene-based polymer has a weight average molecular weight of 100,000 grams per mol ("g/mol") or greater, or 125,000 g/mol or greater, or 150,000 g/mol or greater, or 175,000 g/mol or greater, or 200,000 g/mol or greater, or 225,000 g/mol or greater, while at the same time, 250,000 g/mol or less, or 225,000 g/mol or less, or 200,000 g/mol or less, or 175,000 g/mol or less, or 150,000 g/mol or less, or 125,000 g/mol or less as measured according to Gel Permeation Chromatography.

In bimodal examples, the ethylene-based polymer comprises a low molecular weight fraction and a high molecular weight fraction. In such examples, the ethylene-based polymer may comprise the high molecular weight fraction in an amount of from 40 wt % or greater, or 42 wt % or greater, or 44 wt % or greater, or 46 wt % or greater, or 47 wt % or greater, or 50 wt % or greater, or 52 wt % or greater, or 54 wt % or greater, or 56 wt % or greater, or 58 wt % or greater, while at the same time, 60 wt % or less, or 58 wt % or less, or 56 wt % or less, or 54 wt % or less, or 52 wt % or less, or 50 wt % or less, or 48 wt % or less, or 46 wt % or less, or 44 wt % or less, or 42 wt % or less based on a total weight of the ethylene-based polymer. It is understood that the low molecular weight fraction is present in the ethylene-based polymer in a wt % that is inverse to the high molecular weight fraction.

The high molecular weight fraction of the ethylene-based polymer has a density of from 0.917 g/cc to 0.929 g/cc. For example, the high molecular weight fraction may have a density of from 0.917 g/cc or greater, or 0.919 g/cc or greater, or 0.921 g/cc or greater, or 0.923 g/cc or greater, or 0.925 g/cc or greater, while at the same time, 0.927 g/cc or less, or 0.925 g/cc or less, or 0.923 g/cc or less, or 0.921 g/cc or less, or 0.919 g/cc or less as measured according to ASTM D792.

The high molecular weight fraction of the ethylene-based polymer has a high load melt index ($I_{21}$) of from 0.85 dg/min to 4.00 dg/min. For example, the high molecular weight component may have a high load melt index ($I_{21}$) of 0.85 dg/min or greater, or 0.90 dg/min or greater, or 1.00 dg/min or greater, or 1.20 dg/min or greater, or 1.40 dg/min or greater, or 1.60 dg/min or greater, or 1.80 dg/min or greater, or 2.00 dg/min or greater, or 2.20 dg/min or greater, or 2.40 dg/min or greater, or 2.60 dg/min or greater, or 2.80 dg/min or greater, or 3.00 dg/min or greater, or 3.20 dg/min or greater, or 3.40 dg/min or greater, or 3.60 dg/min or greater, or 3.80 dg/min or greater, while at the same time, 4.00 dg/min or less, or 3.80 dg/min or less, or 3.60 dg/min or less, or 3.40 dg/min or less, or 3.20 dg/min or less, or 3.00 dg/min or less, or 2.80 dg/min or less, or 2.60 dg/min or less, or 2.40 dg/min or less, or 2.20 dg/min or less, or 2.00 dg/min or less, or 1.80 dg/min or less, or 1.60 dg/min or less, or 1.40 dg/min or less, or 1.20 dg/min or less, or 1.00 dg/min or less, or 0.90 dg/min or less as measured according to ASTM D1238.

The high molecular weight component of the ethylene-based polymer has a weight average molecular weight of 200,000 g/mol or greater, or 225,000 g/mol or greater, or 250,000 g/mol or greater, or 275,000 g/mol or greater, or 300,000 g/mol or greater, or 325,000 g/mol or greater, or 350,000 g/mol or greater, or 375,000 g/mol or greater, while at the same time, 400,000 g/mol or less, or 375,000 g/mol or less, or 350,000 g/mol or less, or 325,000 g/mol or less, or 300,000 g/mol or less, or 275,000 g/mol or less, or 250,000 g/mol or less, or 225,000 g/mol or less as measured according to Gel Permeation Chromatography.

Ionomer and Acid Copolymer

The polymeric composition comprises one or more of an ionomer and an acid copolymer. As used herein, the term "ionomer" means an acid copolymer that has been partially or fully neutralized. As used herein, the term "acid copolymer" means a copolymer that comprises repeat units derived from ethylene and 1 wt % to 50 wt % of an acidic comonomer such as acrylic acid, methacrylic acid, ethacrylic acid, or combinations thereof, based on the total weight of the acid copolymer. For example, an acid copolymer may comprise 0.5 wt % or greater, or 1 wt % or greater, or 2 wt % or greater, or 3 wt % or greater, or 4 wt % or greater, or 5 wt % or greater, or 10 wt % or greater, or 20 wt % or greater, or 30 wt % or greater, or 40 wt % or greater, while at the same time, 50 wt % or less, or 40 wt % or less, or 30 wt % or less, or 20 wt % or less, or 10 wt % or less, or 5 wt % or less, or 4 wt % or less, or 3 wt % or less, or 2 wt % or less, or 1 wt % or less of an acidic comonomer based on the total weight of the acid copolymer.

The ionomer may comprise up to 35 wt % of an optional comonomer based on a total weight of the ionomer. Potential comonomers include carbon monoxide, sulfur dioxide, acrylonitrile, maleic anhydride, maleic acid diesters, maleic acid, maleic acid monoesters, itaconic acid, fumaric acid, fumaric acid monoester, a salt of these acids, glycidyl acrylate, glycidyl methacrylate, and glycidyl vinyl ether, methyl acrylate, ethyl acrylate, isopropyl acrylate, butyl acrylate, pentyl acrylate, methyl methacrylate, ethyl methacrylate, propyl methacrylate and butyl methacrylate, pentyl methacrylate, or combinations thereof where the alky group can be linear or branched.

The ionomer may have a wide degree of neutralization. For example, the ionomer can be neutralized at 0.1% or greater, or 1% or greater, or 10% or greater, or 15 wt % or greater, or 20% or greater, or 30% or greater, or 40% or greater, or 50% or greater, or 60% or greater, or 70% or greater, or 80% or greater, or 90% or greater, while at the same time, 100% or less, or 90% or less, or 80% or less, or 70% or less, or 60% or less, or 50% or less, or 40% or less, or 30% or less, or 20% or less, or 15 wt % or less, or 10% or less, or 5% or less based on the total acid content. The ionomer may be neutralized using one or more metallic ions. The metallic ions can be monovalent, divalent, trivalent, multivalent, or combinations thereof. Examples of suitable metallic ions include Li, Na, Ag, Hg, Cu, Be, Mg, Ca, Sr, Ba, Cd, Sn, Pb, Fe, Co, Zn, Ni, Al, Sc, Hf, Ti, Zr, Ce, K, Na and combinations thereof. If the metallic ion is multivalent, a complexing agent, such as stearate, oleate, salicylate, and phenolate radicals can be included.

The ionomer can be a blend of an ionomer having a greater than 20% neutralization and, for example, a second ethylene acid copolymer to achieve the desired degree of neutralization. For example, the ionomer can comprise 1 wt % to 50 wt % an acid copolymer disclosed above.

An example of a commercially available ionomer includes SURLYN™ ionomers available from The Dow Chemical Company, Midland, MI, USA. An example of a commercially available acid copolymer includes NUCREL™ 0411HS acid copolymers from Dow Chemical, Midland, Michigan.

The polymeric composition comprises from 1 wt % to 10 wt % of the ionomer based on a total weight of the polymeric composition. For example, the polymeric composition comprises 1 wt % or greater, or 2 wt % or greater, or 3 wt % or greater, or 4 wt % or greater, or 5 wt % or greater, or 6 wt % or greater, or 7 wt % or greater, or 8 wt % or greater, or 9 wt % or greater, while at the same time, 10 wt % or less, or 9 wt % or less, or 8 wt % or less, or 7 wt % or less, or 6 wt % or less, or 5 wt % or less, or 4 wt % or less, or 3 wt % or less, or 2 wt % or less of one or more of the ionomer based on a total weight of the polymeric composition.

The polymeric composition comprises from 1 wt % to 10 wt % of the acid copolymer based on a total weight of the polymeric composition. For example, the polymeric composition comprises 1 wt % or greater, or 2 wt % or greater, or 3 wt % or greater, or 4 wt % or greater, or 5 wt % or greater, or 6 wt % or greater, or 7 wt % or greater, or 8 wt % or greater, or 9 wt % or greater, while at the same time, 10 wt % or less, or 9 wt % or less, or 8 wt % or less, or 7 wt % or less, or 6 wt % or less, or 5 wt % or less, or 4 wt % or less, or 3 wt % or less, or 2 wt % or less of one or more of the acid copolymer based on a total weight of the polymeric composition.

Maleic Anhydride Functionalized Polyolefin

The polymeric composition comprises a maleic anhydride functionalized polyolefin. As used herein, the term "maleic anhydride functionalized" indicates a polyolefin that has been modified to incorporate a maleic anhydride monomer. The maleic anhydride functionalized polyolefin can be formed by copolymerization of maleic anhydride monomer with ethylene and other monomers (if present) to prepare an interpolymer having maleic anhydride incorporated into the polymer backbone. Additionally, or alternatively, the maleic anhydride can be graft-polymerized to the polyolefin. The polyolefin that is maleic anhydride functionalized may be any of the previously discussed ethylene-based polymers.

The maleic anhydride functionalized polyolefin can have a density of 0.87 g/cc or greater, or 0.88 g/cc or greater, or 0.89 g/cc or greater, or 0.90 g/cc or greater, or 0.91 g/cc or greater, or 0.92 g/cc or greater, or 0.93 g/cc or greater, or 0.94 g/cc or greater, or 0.95 g/cc or greater, 0.96 g/cc or greater, while at the same time, 0.97 g/cc or less, or 0.965 g/cc or less, or 0.96 g/cc or less, or 0.95 g/cc or less, or 0.94 g/cc or less, or 0.93 g/cc or less, or 0.92 g/cc or less, or 0.91 g/cc or less, or 0.90 g/cc or less, or 0.89 g/cc or less, or 0.88 g/cc or less, or 0.87 g/cc or less as measured by ASTM D792.

The maleic anhydride functionalized polyolefin has an melt flow index of 1 g/10 min. or greater, or 2 g/10 min. or greater, 3 g/10 min. or greater, 4 g/10 min. or greater, 5 g/10 min. or greater, 6 g/10 min. or greater, 7 g/10 min. or greater, 8 g/10 min. or greater, 9 g/10 min. or greater, 10 g/10 min. or greater, or 11 g/10 min. or greater, or 12 g/10 min. or greater, 13 g/10 min. or greater, 14 g/10 min. or greater, 15 g/10 min. or greater, 16 g/10 min. or greater, 17 g/10 min. or greater, 18 g/10 min. or greater, 19 g/10 min. or greater, while at the same time, 20 g/10 min. or less, or 19 g/10 min. or less, or 18 g/10 min. or less, or 17 g/10 min. or less, or 16 g/10 min. or less, or 15 g/10 min. or less, or 14 g/10 min.

or less, or 13 g/10 min. or less, or 12 g/10 min. or less, or 11 g/10 min. or less, or 10 g/10 min. or less, or 9 g/10 min. or less, or 8 g/10 min. or less, or 7 g/10 min. or less, or 6 g/10 min. or less, or 5 g/10 min. or less, or 4 g/10 min. or less, or 3 g/10 min. or less, or 2 g/10 min. or less. The melt index is measured in accordance with ASTM D1238 at 190° C. and 2.16 kg.

The maleic anhydride functionalized polyolefin can have a maleic anhydride content, based on the total weight of the maleic anhydride functionalized polyolefin, of 0.25 wt % or greater, or 0.50 wt % or greater, or 0.75 wt % or greater, or 1.00 wt % or greater, or 1.25 wt % or greater, or 1.50 wt % or greater, or 1.75 wt % or greater, or 2.00 wt % or greater, or 2.25 wt % or greater, or 2.50 wt % or greater, or 2.75 wt % or greater, while at the same time, 3.00 wt % or less, 2.75 wt % or less, or 2.50 wt % or less, or 2.25 wt % or less, or 2.00 wt % or less, or 1.75 wt % or less, or 1.50 wt % or less, or 1.25 wt % or less, or 1.00 wt % or less, or 0.75 wt % or less, or 0.5 wt % or less. Maleic anhydride concentrations are determined by Titration Analysis. Titration Analysis is performed by utilizing dried resin and titrates with 0.02N KOH to determine the amount of maleic anhydride. The dried polymers are titrated by dissolving 0.3 to 0.5 grams of maleic anhydride functionalized polyolefin in about 150 mL of refluxing xylene. Upon complete dissolution, deionized water (four drops) is added to the solution and the solution is refluxed for 1 hour. Next, 1% thymol blue (a few drops) is added to the solution and the solution is over titrated with 0.02N KOH in ethanol as indicated by the formation of a purple color. The solution is then back-titrated to a yellow endpoint with 0.05N HCl in isopropanol.

The polymeric composition may comprise 4 wt % or greater, or 5 wt % or greater, or 6 wt % or greater, or 7 wt % or greater, or 8 wt % or greater, or 9 wt % or greater, or 10 wt % or greater, or 11 wt % or greater, or 12 wt % or greater, or 13 wt % or greater, or 14 wt % or greater, or 15 wt % or greater, or 16 wt % or greater, or 17 wt % or greater, while at the same time, 18 wt % or less, or 17 wt % or less, or 16 wt % or less, or 15 wt % or less, or 14 wt % or less, or 13 wt % or less, or 12 wt % or less, or 11 wt % or less, or 10 wt % or less, or 9 wt % or less, or 8 wt % or less, or 7 wt % or less, or 6 wt % or less, or 5 wt % or less, or 4 wt % or less of maleic anhydride functionalized polyolefin based on the total weight of the polymeric composition.

An example of a suitable commercially available maleic anhydride functionalized polyolefin is AMPLIFY™ GR208 available from The Dow Chemical Company, Midland, MI, USA.

Flame Retardant Filler

The polymeric composition comprises a flame retardant filler. The flame retardant of the polymeric composition can inhibit, suppress, or delay the production of flames. Examples of the flame retardants suitable for use in the polymeric composition include, but are not limited to, metal hydroxides, metal carbonates, red phosphorous, silica, alumina, aluminum tri-hydroxide, magnesium hydroxide, titanium oxide, carbon nanotubes, talc, clay, organo-modified clay, calcium carbonate, zinc borate, antimony trioxide, wollastonite, mica, ammonium octamolybdate, frits, hollow glass microspheres, intumescent compounds, expanded graphite, and combinations thereof. Specifically, the halogen-free flame retardant can be selected from the group consisting of aluminum hydroxide, magnesium hydroxide, calcium carbonate, and combinations thereof. The flame retardant can optionally be surface treated (coated) with a saturated or unsaturated carboxylic acid having 8 to 24 carbon atoms, or 12 to 18 carbon atoms, or a metal salt of the acid. Exemplary surface treatments are described in U.S. Pat. Nos. 4,255,303, 5,034,442, 7,514,489, US 2008/0251273, and WO 2013/116283. Alternatively, the acid or salt can be merely added to the composition in like amounts rather than using the surface treatment procedure. Other surface treatments known in the art may also be used including silanes, titanates, phosphates and zirconates.

Commercially available examples flame retardants suitable for use in the polymeric composition include, but are not limited to, APYRAL™ 40CD aluminum hydroxide available from Nabaltec AG, MAGNIFIN™ H5 magnesium hydroxide available from Magnifin Magnesiaprodukte GmbH & Co KG, Microcarb 95T ultramicronized and treated calcium carbonate available from Reverte, and combinations thereof.

The polymeric composition may comprise the flame retardant filler in an concentration of 10 wt % or greater, or 20 wt % or greater, or 22 wt % or greater, or 24 wt % or greater, or 26 wt % or greater, or 28% or greater, or 30 wt % or greater, or 32 wt % or greater, or 34 wt % or greater, or 36 wt % or greater, or 38% or greater, or 40 wt % or greater, or 42 wt % or greater, or 44 wt % or greater, or 46 wt % or greater, or 48% or greater, or 50 wt % or greater, or 52 wt % or greater, or 54 wt % or greater, or 56 wt % or greater, or 58% or greater, or 60 wt % or greater, or 62 wt % or greater, or 64 wt % or greater, or 66 wt % or greater, or 68% or greater, or 70 wt % or greater, or 72 wt % or greater, or 74 wt % or greater, or 76 wt % or greater, or 78% or greater, while at the same time, 80 wt % or less, or 78 wt % or less, or 76 wt % or less, or 74 wt % or less, or 72 wt % or less, or 70 wt % or less, or 68 wt % or less, or 66 wt % or less, or 64 wt % or less, or 62 wt % or less, or 60 wt % or less, or 58 wt % or less, or 56 wt % or less, or 54 wt % or less, or 52 wt % or less, or 50 wt % or less, or 48 wt % or less, or 46 wt % or less, or 44 wt % or less, or 42 wt % or less, or 40 wt % or less, or 38 wt % or less, or 36 wt % or less, or 34 wt % or less, or 32 wt % or less, or 30 wt % or less, or 28 wt % or less, or 26 wt % or less, or 24 wt % or less, or 22 wt % or less, or 20 wt % or less based on the weight of the polymeric composition.

Additives

The polymeric composition may comprise additional additives in the form of antioxidants, cross-linking co-agents, cure boosters and scorch retardants, processing aids, coupling agents, ultraviolet stabilizers (including UV absorbers), antistatic agents, additional nucleating agents, slip agents, lubricants, viscosity control agents, tackifiers, anti-blocking agents, surfactants, extender oils, acid scavengers, anti-drip agents (e.g., ethylene vinyl acetate) and metal deactivators. The polymeric composition may comprise from 0.01 wt % to 20 wt % of one or more of the additional additives.

The UV light stabilizers may comprise hindered amine light stabilizers ("HALS") and UV light absorber ("UVA") additives. Representative UVA additives include benzotriazole types such as TINUVIN 326™ light stabilizer and TINUVIN 328™ light stabilizer commercially available from Ciba, Inc. Blends of HAL's and UVA additives are also effective.

The antioxidants may comprise hindered phenols such as tetrakis[methylene(3,5-di-tert-butyl-4-hydroxyhydro-cinnamate)] methane; bis [(beta-(3,5-ditert-butyl-4-hydroxybenzyl) methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-ditert-butylphenyl)phosphite and di-tert-butylphenyl-phosphonite; thio compounds such as dilaurylthiodipropionate, dimyristylthiodipropionate, and distearylthiodipropionate; various polymerized siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

The processing aids may comprise metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; silicone fluids, polysiloxanes, fluoropolymers, and/or fluoroelastomers.

Compounding

The components of the polymeric composition can be added to a batch or continuous mixer for melt blending. The components can be added in any order or first preparing one or more masterbatches for blending with the other components. The melt blending may be conducted at a temperature above the highest melting polymer but lower than the maximum compounding temperature of 285° C. The melt-blended composition can then either be delivered to an extruder or an injection-molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Examples of compounding equipment that may be used include internal batch mixers, continuous single or twin-screw mixers, or kneading continuous extruders. The type of mixer utilized, and the operating conditions of the mixer, will affect properties of the composition such as viscosity, volume resistivity, and extruded surface smoothness.

Cable

The polymeric composition may be utilized in a cable. In some examples, the cable may be a coated conductor. In other examples, the cable may be a fiber optic cable. In coated conductor examples, the coated conductor includes a conductor and a coating on the conductor, the coating including the polymeric composition. The polymeric composition is at least partially disposed around the conductor to produce the coated conductor. The conductor may comprise a conductive metal or an optically transparent structure.

In optical fiber cable examples, the cable comprises a conductor and the polymeric composition is positioned around the conductor. The polymeric composition may be in the form of a buffer tube, one or more jacketing layers on the cable, and/or as other components in the cable. The conductor may include optical fibers or other transmissive components. The optical fiber cable may be a "loose buffer tube" design where buffer tubes are positioned radially around a central strength member, with a helical rotation to the buffer tubes along an axial length of the optical fiber cable. One or more conductors may be positioned within the buffer tube such that the buffer tube is positioned around the conductor. The buffer tubes may comprise, consist or consist essentially of the polymeric composition. As such, the buffer tube may be a polymeric tube. The buffer tubes are optionally filled with an optic cable grease or gel. Gel and grease compounds may include hydrocarbon-based greases incorporating hydrocarbon oils and/or polymer-based greases that use a low viscosity polymer formulated with hydrocarbon oils.

EXAMPLES

Materials

The following materials were used in the examples.

EVA is an ethylene vinyl acetate ("EVA") copolymer having 28 wt % vinyl acetate based on the total weight of the copolymer and is commercially available from The Dow Chemical Company, Midland, MI, USA.

ATH is aluminum trihydroxide commercially available as APYRAL™ 40 CD from Brenntag, Essen, Germany.

MDH is magnesium hydroxide having a density of 2.36 g/cc and is commercially available as MAGNIFIN™ H5 from Magnifin Magnesiaprodukte GmbH & Co KG, Austria.

HDPE1 is a UNIPOL™ II bimodal polyethylene having a hexene comonomer, a density of 0.95 g/cc and a melt index ($I_2$) of 0.5 g/10 min. at 190° C., from The Dow Chemical Company, Midland, MI, USA.

HDPE2 is a bimodal polyethylene having a hexene comonomer, a density of 0.955 g/cc and a melt index ($I_2$) of 0.3 g/10 min. at 190° C., that is commercially available as DGDA-1310NT from The Dow Chemical Company, Midland, MI, USA.

MAH-g-LLDPE(1) is a maleic-anhydride-grafted plastomer having a density of 0.902 g/cc, a melt index of 3.3 g/10 min., and a maleic anhydride content of 0.45 wt %, that is commercially available from The Dow Chemical Company, Midland, MI, USA.

MAH-g-POE is a maleic-anhydride-grafted LLDPE having a density of 0.875 g/cc, a melt index of 1.3 g/10 min., and a maleic anhydride content of 0.90 wt %, that is commercially available from The Dow Chemical Company, Midland, MI, USA.

MAH-g-HDPE is a maleic-anhydride-grafted HDPE having a density of 0.958 g/cc, a melt index of 2.0 g/10 min., and a maleic anhydride content of 1.35 wt %, that is commercially available from The Dow Chemical Company, Midland, MI, USA.

MAH-g-LLDPE(2) is a maleic-anhydride-grafted LLDPE having a density of 0.912 g/cc, a melt index of 2.1 g/10 min., and a maleic anhydride content of 2.4 wt %, that is commercially available from The Dow Chemical Company, Midland, MI, USA.

MAA Ionomer1 is a methacrylic acid-ethylene copolymer that is neutralized with Zn having 15 wt % methacrylic acid units, a density of 0.952 g/cc and a melt index of 14 g/10 min. that is commercially available from The Dow Chemical Company, Midland, MI, USA.

MAA Ionomer2 is a methacrylic acid-ethylene copolymer that is neutralized with Mg having 19 wt % methacrylic acid units, a density of 0.952 g/cc and a melt index of 6 g/10 min. from The Dow Chemical Company, Midland, MI, USA.

PDMS is polydimethylsiloxane oil that has a density of 0.977 g/cc, a viscosity of 60,000 centistokes and is commercially available from The Dow Chemical Company, Midland, MI, USA.

AO1 is a sterically hindered phenolic antioxidant having the chemical name pentaerythritol tetrakis(3-(3,5-di-tert-butyl-4-hydroxyphenyl)propionate), that is commercially available as IRGANOX 1010™ from BASF, Ludwigshafen, Germany.

AO2 is Dioctadecyl 3,3'-thiodipropionate which is commercially available as NAUGARD™ DSTDP from Addivant, Danbury, CT, USA.

DFDA is a halogen-free flame retardant filled polyolefin material having a density of 1.50 g/cc and is commercially available as UNIGARD™ DFDA-1638NT from The Dow Chemical Company, Midland, MI, USA.

VLDPE is an ethylene-butene copolymer having a density of 0.901 g/cc and a melt index of 5.2 g/10 min., that is commercially available as FLEXOMER™ DFDB-9042NT from The Dow Chemical Company, Midland, MI, USA.

ACP is an acid copolymer having 4 wt % methacrylic acid units, a melt index ($I_2$) of 11 g/10 min. and is commercially available as NUCREL™ 0411HS acid copolymers from Dow Chemical, Midland, Michigan Sample Preparation Samples were produced by melt blending in a BRABENDER™ mixer. All samples (excluding commercial samples) were mixed in a lab scale, 250 gram BRABENDER™ mixing bowl with 250 gm capacity using BANBURY™ type mixing blades with the settings shown in Table 1. After melt mixing, the molten material was removed and placed between biaxially-oriented polyethylene terephthalate sheets and pressed into a sheet using a WABASH™ compression molding press at 23° C. The material was then cut into strips to enable pelletizing using a BERLYN™ pelletizing unit.

Pellets of each sample were then used to produce tape samples using a BRABENDER™ tape extruder with conditions shown in the Table 2. The tapes had dimensions of 1.58 mm thickness and about 51 mm width. Type 4a dog bone samples were die cut out in machine directions for tensile and elongation measurements per ASTM D638.

TABLE 1

BRABENDER™ Mixing Parameters

| Setting | Unit | |
|---|---|---|
| Middle temperature | C. | 191 |
| Current | Amp | 7 |
| End temperature | C. | 187 |
| Speed | RPM | 55 |
| Mixing time | Min | 8 |

TABLE 2

BRABENDER™ Tape Extrusion Parameters

| Setting | Unit | |
|---|---|---|
| Zone 1 | C. | 160 |
| Zone 2 | C. | 170 |
| Zone 3 | C. | 180 |
| Zone 4 | C. | 180 |
| Melt Temperature | C. | 185 |
| Extruder RPM | RPM | 60 |

Test Methods

Tensile and Elongation

Five type 4 dog bone specimens for each sample were die-cut from the tape samples in the machine direction. Tensile and elongation were completed on an INSTRON™ 4201 tensile testing machine using a 100 lbs load cell at 2 in/min strain rate per ASTM D638.

Flexural Modulus

Plaques for flexural modulus were compression molded in a 3.18 mm 20 cm×20 cm. steel mold at 180° C. The samples were die cut to dimension of approximately 3 cm×1 cm. The test was conducted according to ASTM D790 with a crosshead speed of 1.27 mm/min and 51 mm support span.

Cone Calorimetry

Samples for cone calorimetry testing were produced by compression molding and then die cutting to a size of 100 mm×100 mm×3 mm. Tests were completed per ASTM E1354 at a heat flux set at 50 kW/m$^2$. Samples were tested without a grid and the reported values are the average of 2-3 samples. The calorimetry results are expressed as a peak heat release rate ("PHRR").

Burn Testing

Burn testing was carried out according to Underwriter's Laboratory standard 94 which is the standard for safety of flammability of plastic materials for parts in devices and appliances. Vertical burn was measured per test standards on 125 mm×13 mm samples cut from 3.175 mm thick plaques. Per the test, V-2 designates a vertical sample stops burning within 30 seconds and allows for drips of flaming particles. V-0 designates that burning stops within 10 seconds on a vertical specimen and that drips of particles allowed as long as they are not inflamed.

Extruded Tape/Mandrel Bending Test

Tape samples were wrapped 1 complete wrap around a mandrel having a diameter of about 7.7 mm and held in that position for 10 seconds minimum. Any kinking or breaks were recorded for each sample.

Results

Table 3 provides the composition of comparative examples ("CE")1-13 and Table 4 provides the mechanical property and burn performance data for each of the comparative examples. Table 5 provides inventive examples ("IE") and as well as mechanical property and burn performance data for each. In Table 3-5, the term "NM" stand for not measured.

TABLE 3

| Components (wt %) | CE1 | CE2 | CE3 | CE4 | CE5 | CE6 | CE7 | CE8 | CE9 | CE10 | CE11 | CE12 | CE13 |
|---|---|---|---|---|---|---|---|---|---|---|---|---|---|
| DFDA | | | | 100 | | | | | | | | | |
| EVA | 39.8 | 33.8 | 39.5 | | | | | | | | | | |
| HDPE1 | | | | | 25.8 | 25.8 | 26.8 | 26.8 | 31.8 | | 29.8 | 25.8 | 26.8 |
| HDPE2 | | | | | | | | | | 25.8 | | | |
| MDH | | | | | 66 | 66 | 66 | 66 | 60 | 66 | 63 | 66 | 66 |
| ATH | 60.0 | 60.0 | 60.0 | | | | | | | | | | |
| VLDPE | | | | | | | | | | | | 6 | |
| MAH-g-LLDPE(1) | | | | | 6 | 6 | 3 | 6 | 6 | 4 | | | 6 |
| MAH-g-POE | | 6 | | | | | | | | | | | |

TABLE 3-continued

| Components (wt %) | CE1 | CE2 | CE3 | CE4 | CE5 | CE6 | CE7 | CE8 | CE9 | CE10 | CE11 | CE12 | CE13 |
|---|---|---|---|---|---|---|---|---|---|---|---|---|---|
| MAA Ionomer1 | | | 0.3 | | | 1 | 6 | 3 | 1 | 1 | 2 | 1 | |
| MAA Ionomer2 | | | | | | | | | | | | | |
| ACP | | | | | 1 | | | | | | | | |
| PDMS | | | | | 1 | 1 | 1 | 1 | 1 | 1 | 1 | 1 | 1 |
| AO1 | 0.1 | 0.1 | 0.1 | | 0.2 | 0.2 | 0.2 | 0.2 | 0.2 | 0.2 | 0.2 | 0.2 | 0.2 |
| AO2 | 0.1 | 0.1 | 0.1 | | | | | | | | | | |
| Total | 100 | 100 | 100 | 100 | 100 | 100 | 100 | 100 | 100 | 100 | 100 | 100 | 100 |

TABLE 4

| Property | CE1 | CE2 | CE3 | CE4 | CE5 | CE6 | CE7 | CE8 | CE9 | CE10 | CE11 | CE12 | CE13 |
|---|---|---|---|---|---|---|---|---|---|---|---|---|---|
| MAH Product | 0 | 4.8 | 0 | 1.8 | 2.7 | 2.7 | 0 | 1.35 | 2.7 | 2.7 | 1.8 | 0 | 2.7 |
| Elongation at Break (%) | 134 | 305 | 153 | 121 | 15 | 7 | 3 | 4 | 19 | 8 | 7 | 1 | 19 |
| Flex modulus (MPa) | NM | NM | NM | 174 | 1616 | 1900 | 1974 | 1645 | 1247 | 1557 | 1366 | 1815 | 1503 |
| Calorimetry PHRR (kW/m$^2$) | NM | NM | NM | 150 | 137 | 112.2 | 136.9 | 132 | 161 | 140 | NM | NM | 130.5 |
| Burn Rating | V-2 | V-2 | V-0 | NM | NM | NM | NM | NM | NM | NM | NM | NM | NM |
| Break | NM | NM | NM | No | NM | Yes | Yes | Nm | NM | NM | Yes | Yes | Yes |

TABLE 5

| Components (wt %) | IE1 | IE2 | IE3 | IE4 | IE5 | IE6 | IE7 | IE8 | IE9 | IE10 |
|---|---|---|---|---|---|---|---|---|---|---|
| EVA | | | | | | 33.45 | 31.6 | | | |
| HDPE1 | 19.8 | 19.8 | 25.8 | 19.8 | 19.8 | | | 19.8 | 25.8 | 25.8 |
| MDH | 66 | 66 | 66 | 66 | 66 | | | 66 | 66 | 66 |
| ATH | | | | | | 60.0 | 60.0 | | | |
| MAH-g-LLDPE(1) | 12 | | | | | | | | | |
| MAH-g-POE | | | | | | 6.0 | 6.0 | 12 | 6 | |
| MAH-g-HDPE | | 12 | | 6 | | | | | | |
| MAH-g-LLDPE(2) | | | 6 | 6 | 12 | | | | | 6 |
| MAA Ionomer1 | 1 | 1 | 1 | 1 | 1 | 0.3 | | 1 | 1 | |
| MAA Ionomer2 | | | | | | | 2.2 | | | |
| ACP | | | | | | | | | | 1 |
| PDMS | 1 | 1 | 1 | 1 | 1 | | | 1 | 1 | 1 |
| AO1 | 0.2 | 0.2 | 0.2 | 0.2 | 0.2 | 0.1 | 0.1 | 0.2 | 0.2 | 0.2 |
| AO2 | | | | | | 0.1 | 0.1 | | | |
| Total | 100 | 100 | 100 | 100 | 100 | 100 | 100 | 100 | 100 | 100 |
| MAH-Product | 5.4 | 16.2 | 14.4 | 22.5 | 28.8 | 4.8 | 4.8 | 10.8 | 5.4 | 14.4 |
| Elongation at Break (%) | 24 | 22 | 25 | 24 | 32 | 271 | 204 | 67 | 38.0 | 30 |
| Flex modulus (MPa) | 971 | 1949 | 1684 | 1580 | 1446 | NM | NM | 539 | 1018 | 1409 |
| Calorimetry (kW/m$^2$) | 112.2 | 113.4 | 130.5 | 120.2 | 107.9 | NM | NM | 128 | 140.1 | 120.9 |
| Burn Rating | NM | NM | NM | NM | NM | V-0 | V-0 | NM | NM | NM |
| Break | No | No | No | No | No | NM | NM | No | No | No |

Referring now to Tables 3 and 4, CE1-3 suggest that the incorporation of MAH-g-POE or an ionomer alone are not enough to produce a polymeric composition with the desired mechanical and burn properties. For example, CE2 exceeds the elongation at break for an EVA based composition. CE4 represents a typical commercial HFFR jacket compound with no ionomer and a low MAH Product. CE5, CE6 and CE8-11 all demonstrate that despite the inclusion of a maleic anhydride functionalized polyolefin and an ionomer or acid copolymer, if the MAH product is less than 3 the polymeric composition can't meet the minimum property requirements. CE12 demonstrates that a composition with an MAH Product of 0 does not meet the required properties. CE13 demonstrates that the polymeric composition can't meet the minimum requirements without both the ionomer and the maleic anhydride functionalized polyolefin.

Referring now to Table 5, IE1-10 demonstrate that a polymeric composition comprising an ethylene-based polymer, one or more of an ionomer and an acid copolymer, a flame-retardant filler, and a maleic anhydride functionalized polyolefin exhibiting a MAH Product of 3 or greater are able to meet all of the desired properties. As can be seen, the calorimetry values of IE1-IE8 will all achieve 141 kW/m$^2$ PHRR or less and IE6 and IE7 achieved the V-0 burn rating suggesting each would also achieve 141 kW/m$^2$ PHRR or less. IE1-IE9 demonstrate that a wide variety of different maleic anhydride functionalized polyolefins, flame retardant fillers, ionomers and ethylene-based polymers can be used and still achieve the desired properties. Further, IE1-9 demonstrate the mechanical properties are met whether or not the polymeric composition has an HDPE or an EVA based composition. IE10 demonstrates that the use of an acid copolymer, rather than an ionomer, may also achieve the desired properties in a polymeric composition.

What is claimed is:

1. A polymeric composition, comprising:
   an ethylene-based polymer;
   one or more of an ionomer and an acid copolymer, wherein the polymeric composition comprises from 0.1 wt % to 10 wt % of the ionomer or acid copolymer based on the total weight of the polymeric composition;
   a flame-retardant filler; and
   a maleic anhydride functionalized polyolefin, wherein the polymeric composition has an MAH Product of 3 or greater.

2. The polymeric composition of claim 1, wherein the polymeric composition comprises from 4 wt % to 16 wt % of the maleic anhydride functionalized polyolefin based on the total weight of the polymeric composition.

3. The polymeric composition of claim 1, wherein the maleic anhydride functionalized polyolefin comprises 0.4 wt % or greater maleic anhydride based on the total weight of the maleic anhydride functionalized polyolefin.

4. The polymeric composition of claim 1, wherein the maleic anhydride functionalized polyolefin has a density of 0.90 g/cc to 0.920 g/cc as measured according to ASTM D792.

5. A polymeric composition, comprising:
   an ethylene-based polymer;
   one or more of an ionomer and an acid copolymer;
   a flame-retardant filler; and
   a maleic anhydride functionalized polyolefin, wherein the polymeric composition has an MAH Product of 3 or greater, wherein the ethylene-based polymer has a bimodal molecular weight distribution, has a Melt Flow Ratio of 70.0 or greater and has a density of 0.945 g/cc or greater as measured according to ASTM D792.

6. The polymeric composition of claim 1, wherein the polymeric composition comprises from 18 wt % to 50 wt % of the ethylene-based polymer based on the total weight of the polymeric composition.

7. The polymeric composition of claim 6, wherein the polymeric composition comprises from 10 wt % to 80 wt % of the flame retardant filler based on a total weight of the polymeric composition.

8. The polymeric composition of claim 7, wherein the polymeric composition comprises the ionomer and the ionomer is neutralized with one or more metal ions selected from the group consisting of Na, Zn, Li, K, Mg and combinations thereof.

9. A cable, comprising:
   a conductor; and
   a buffer tube positioned around the conductor and comprising the polymeric composition claim 1.

* * * * *